US 6,729,985 B2

(12) United States Patent
Crewe et al.

(10) Patent No.: US 6,729,985 B2
(45) Date of Patent: May 4, 2004

(54) CONTINUOUSLY VARIABLE REVERSIBLE TRANSMISSION

(75) Inventors: William Crewe, Mount Helena (AU); Richard Monk, Dunsboruough (AU)

(73) Assignee: Epidrive PTY Ltd., West Perth (AU)

( * ) Notice: Subject to any disclaimer, the term of this patent is extended or adjusted under 35 U.S.C. 154(b) by 138 days.

(21) Appl. No.: 10/149,583
(22) PCT Filed: Dec. 18, 2000
(86) PCT No.: PCT/AU00/01568
§ 371 (c)(1), (2), (4) Date: Jun. 14, 2002
(87) PCT Pub. No.: WO01/44687
PCT Pub. Date: Jun. 21, 2001

(65) Prior Publication Data
US 2002/0183144 A1 Dec. 5, 2002

(30) Foreign Application Priority Data
Dec. 16, 1999 (AU) .................................. PQ4673

(51) Int. Cl.⁷ .............................................. F16H 9/20
(52) U.S. Cl. ............................................ 474/29; 474/8
(58) Field of Search ................. 474/8, 11, 24, 474/25, 29, 30, 69

(56) References Cited

U.S. PATENT DOCUMENTS

| 2,109,247 A | * | 2/1938 | Clay | 57/94 |
| 2,745,297 A | * | 5/1956 | Andrus | 475/208 |
| 2,893,254 A | * | 7/1959 | Grover | 474/23 |
| 5,121,936 A | * | 6/1992 | Cowan | 280/236 |
| 5,167,591 A | * | 12/1992 | Cowan | 475/211 |
| 5,194,049 A | * | 3/1993 | Knop, Jr. | 474/69 |
| 5,445,580 A | | 8/1995 | Parraga Garcia | |
| 5,632,703 A | * | 5/1997 | Wilkes et al. | 475/211 |

FOREIGN PATENT DOCUMENTS

| EP | 0 321 621 B1 | 6/1989 |
| WO | 98/54489 A1 | 12/1998 |

* cited by examiner

Primary Examiner—Thomas R. Hannon
Assistant Examiner—Vicky A. Johnson
(74) Attorney, Agent, or Firm—Birch, Stewart, Kolasch & Birch, LLP

(57) ABSTRACT

A continuously variable reversible transmission including an input shaft (2), a housing (1), an input arm (4), first and second CVT shafts (5.6), a fixed input wheel (35), a ratio selector mechanism, an overall output wheel (36) and an output shaft (24). The input arm (4) is fixed to the input shaft (2) and extends substantially perpendicular to the input shaft. At each end of the input arm, a first (5) and second (6) CVT shaft is rotatably mounted, with the axes of the CVT shafts extending parallel to the input shaft. The fixed input wheel (35) may be aligned with the axis of the input shaft. The first CVT shaft (5) is coupled with the fixed input wheel (35), the second CVT shaft (6) is coupled with the first CVT shaft (5) and the output wheel (36) which is fixed to the output shaft (24) is coupled with the second CVT shaft. The first and second CVT shafts may orbit around the axis of the input shaft, such that changing the ratio of at least one of the couplings produces a variation of the speed of the output shaft from forwards, through zero to reverse.

23 Claims, 8 Drawing Sheets

CONTINUOUSLY VARIABLE REVERSIBLE TRANSMISSION

This application is the national phase under 35 U.S.C. § 371 of PCT International Application No. PCT/AU00/01568 which has an International filing date of Dec. 18, 2000, which designated the United States of America.

The present invention is directed to the area of mechanical continuously variable power transmissions, in particular continuously variable transmission (CVT) systems for vehicles.

There is presently a trend towards the use of CVT systems in automobiles, beginning in the super-mini class and progressing through to mid-size luxury vehicles. There are many advantages to using a CVT system over a conventional manual or automatic transmission, for example, improvements in economy, performance and versatility. Electronic control easily allows the CVT to be switched between automatic operation and a "manual" mode where it can emulate a clutch-less manual transmission on demand. However most of the CVT systems proposed to date have been limited in that they need additional arrangements of gears to provide reverse and neutral functions.

A small number of prior art CVT systems which can continuously vary the output from a range of forward speeds, though zero to reverse ratios have been proposed. These can have additional application in mopeds and motorcycles as they include an integral reverse. They all use twin, parallel power transmission paths, one path including a CVT, to achieve the desired result of a CVT which can continuously vary the output ratio between two opposite directions, passing cleanly through zero. This prior art can be grouped into two basic arrangements. The first arrangement, proposed by Cowan in U.S. Pat. No. 5,121,936 and by Wilkes et al. in WO 98/54489, uses a planetary gear set to combine the output of the parallel transmission paths of the CVT and another direct or geared drive, such that the final output may vary continuously through a range of forward speeds, zero, and reverse. The second arrangement, proposed by Suzuki in JP 10-274293 and Kanetani JP 8-61459 utilises a differential to combine the CVT path and the linear power transmission path to achieve the same result of a CVT which can continuously vary the output ratio between two opposite directions, passing cleanly through zero. All of these arrangements can be quite bulky and involve more complexity and parts as they use planetary gear-sets or differentials in addition to a CVT.

It is therefore the object of the present invention to provide a continuously variable reversible transmission (CVRT) which overcomes some or all of the disadvantages of the prior art, namely complexity and package size.

With this object in view, there is provided by the present invention a continuously variable reversible transmission system including an input shaft, a housing, an input arm, first and second CVT shafts, a fixed input wheel, a ratio selector mechanism, an overall output wheel and an output shaft. The input shaft has a major axis and the input arm may be fixed to the input shaft, the input arm may include at least first and second portions, each input arm portion extending substantially perpendicular to the input shaft. At each end of the input arm first and second portions, a respective first and second CVT shaft may be rotatably mounted, each of the first and second CVT shafts having a respective major axis extending substantially parallel to the input shaft, the major axis of each of the respective first and second CVT shafts being the axis of rotation of the respective shaft with respect to the input arm.

The fixed input wheel may be aligned with the major axis of the input shaft, the first CVT shaft may be coupled with the fixed input wheel, the second CVT shaft may be coupled with the first CVT shaft, the overall output wheel may be coupled with the second CVT shaft, and the overall output wheel may be fixed to the output shaft. In this arrangement, the first and second CVT shafts may orbit around the major axis of the input shaft due to rotation of the input shaft, such that changing a ratio of at least one of the couplings produces a variation of the speed of the output shaft from forwards, through zero to reverse.

The continuously variable reversible transmission may include a CVT sub-assembly which rotates about the major axis of the input shaft, the CVT sub-assembly including the input arm, the first and second CVT shafts, a CVT input wheel and a CVT output wheel. The CVT input wheel may be mounted on the first CVT shaft such that relative rotation of the CVT input wheel and the first CVT shaft is prevented. The CVT output wheel being mounted on the second CVT shaft such that relative rotation of the CVT output wheel and the second CVT shaft is prevented. The coupling of the first CVT shaft with the fixed input wheel may include the CVT input wheel, and the coupling of the second CVT shaft with the overall output wheel including the CVT output wheel. The rotation of the CVT sub-assembly may thereby cause rotation of the CVT input wheel relative to the fixed input wheel, resulting in a rotation of the first CVT shaft about its major axis in addition to its orbit about the major axis of the input shaft. The coupling between the first CVT shaft and the second CVT shaft in the CVT sub-assembly may be arranged to permit a variable rotation of the second CVT shaft relative to the first CVT shaft, producing a variable CVT ratio. The variable rotation of the second CVT shaft and the CVT output wheel about the major axis of the second shaft in addition to the orbit of the second shaft about the major axis of the input shaft may thereby cause a rotation of the overall output wheel due to the coupling between the CVT output wheel and the overall output wheel, the overall output wheel being fixed to the output shaft. The rotation of the output shaft may then be zero when the CVT ratio is of a set magnitude. As the CVT ratio is increased above the set magnitude, the output shaft turns in a forward direction and as the CVT ratio is decreased below the set magnitude, the output shaft turns in a reverse direction.

The set magnitude of the CVT ratio required to produce zero rotation of the output shaft may be calculated from the effective pitch circle diameters of at least the CVT input wheel, the CVT output wheel and the overall output wheel. As the transmission system is a planetary arrangement, the sizes of the components are all interrelated. Other dimensions can therefore be substituted to enable the same calculation using different combinations of dimensions.

The fixed input wheel and the CVT input wheel may both be toothed gear wheels. The fixed input wheel may be an external tooth gear wheel, like a sun gear in a conventional planetary gear system. Alternatively, the fixed input wheel may be an internally toothed gear wheel meshing with the CVT input wheel like a ring gear in a planetary gear system.

Alternatively the coupling between the fixed input wheel and the CVT input wheel may be achieved by using a looped link, such as a belt, chain or other form of segmented strap. If the fixed input wheel and the CVT input wheel are pulley wheels, then the looped link may be a belt. If these pulley wheels are of variable width, the pulley wheels and belt may thereby provide a variable ratio of the coupling between the fixed input wheel and the CVT input wheel. However, in yet another possible alternative, the looped link may be a chain.

Similarly, on the output side, the overall output wheel and the CVT input wheel may both be toothed gear wheels. The overall output wheel may be an external tooth gear wheel like a sun gear in a conventional planetary gear system. Alternatively, the overall output wheel may be an internally toothed gear wheel meshing with the CVT output wheel like a ring gear in a planetary gear system.

The coupling between the overall output wheel and the CVT output wheel may be by a looped link which can be any belt or chain type device, for example it may be a segmented strap. If the overall output wheel and the CVT output wheel are pulley wheels then the looped link may be a belt, then if the pulley wheels are of variable width, the pulley wheels and belt may thereby provide a variable ratio of the coupling between the overall output wheel and the CVT output wheel. Alternatively, the looped link may be a chain.

The CVT sub-assembly may include a first and a second pair of variable cone pulley wheels coupled by a pulley belt. The first pair of variable cone pulley wheels may be located on the first CVT shaft such that the space between the pulley wheels can be varied and such that the pulley wheels are driven to rotate with the first CVT shaft, the second pair of variable cone pulley wheels may be located on the second CVT shaft such that the space between the pulley wheels can be varied and such that the pulley wheels are driven to rotate with the second CVT shaft. The pulley belt may run between and engage the first and second pairs of variable cone pulley wheels such that as the spacing between the variable cone pulley wheels of each pair of variable cone pulley wheels is changed in opposing directions, the rotation of the second pair of variable cone pulley wheels is increased or reduced in relation to the rotation of the first pair of variable cone pulley wheels, thereby producing a variable CVT ratio. Additionally, the CVT input wheel may be an integral part of one of the pulley wheels of the first pair of variable cone pulley wheels and/or the CVT output wheel may be an integral part of one of the pulley wheels of the second pair of variable cone pulley wheels.

Alternatively, the CVT sub-assembly may include first and second curved friction discs and at least two friction wheels, a second CVT input wheel and a second CVT output wheel. The first and second curved friction discs may be located along the major axis of the input shaft such that they are free to rotate about said axis. The second CVT input wheel may be fixed to the first CVT shaft and may be coupled to the first curved friction disc, the second CVT output wheel may be fixed to the second CVT shaft and may be coupled to the second curved friction disc. Each of the at least two friction wheels may be in contact with each of the curved friction discs, the contact points between the friction wheels and the curved friction discs being controlled by an angular rotation of the friction wheels about an axis which is substantially perpendicular to the input shaft major axis such that as the contact points are varied along the curve of each curved friction disc by controlling the angular rotation of the friction wheels, the rotational speed of the second curved friction disc is changed in relation to the rotational speed of the first curved friction disc, thereby producing a variable CVT ratio.

Alternatively, two variable ratios may be used in series to increase the range of ratios available from the continuously variable reversible transmission. Respective first and second pulley wheels may be fixedly mounted to the first and second CVT shafts, each of the first and second pulley wheels including at least one angled channel around its periphery. The fixed input wheel may be an external ring including friction nodes which contact the at least one angled channel of the first pulley wheel, the friction nodes being controlled radially to vary the point of contact between the friction nodes and the first pulley wheel, to thereby provide a first variable ratio between the rotational velocity of the input shaft about its major axis and the rotational velocity of the first pulley wheel about the major axis of the first CVT shaft. The first CVT shaft may be coupled with the second CVT shaft by a gear fixedly mounted on each shaft. Alternatively, the gears may be an integral part of each pulley wheel. The coupling may be by a looped link. Similarly, the overall output wheel may be an external ring including friction nodes which contact the at least one angled channel of the second pulley wheel, the friction nodes being controlled radially to vary the point of contact between the friction nodes and the second pulley wheel, to thereby provide a second variable ratio between the rotational velocity of the second pulley wheel about the major axis of the second CVT shaft and about the major axis of the input shaft and the rotational velocity of the overall output wheel about the input shaft major axis. The rotation of the output shaft being zero when the ratio between the first variable ratio and the second variable ratio is of a set magnitude. It may be preferable to use only one variable ratio in this arrangement, for example the second variable ratio may be fixed to eliminate the need for adjusting the position of the friction nodes in the rotating overall output wheel.

As may be appreciated, many combinations of the above arrangements are possible in designing a continuously variable reversible transmission system according to the present invention. For example different input and output arrangements to the CVT may be combined to change the range of ratios available, to vary the position of the zero output position within that range of ratios, and to reverse the output direction as required.

Practical applications of the present invention will now be described by way of examples with reference to the accompanying drawings.

In the drawings

Figure 1:
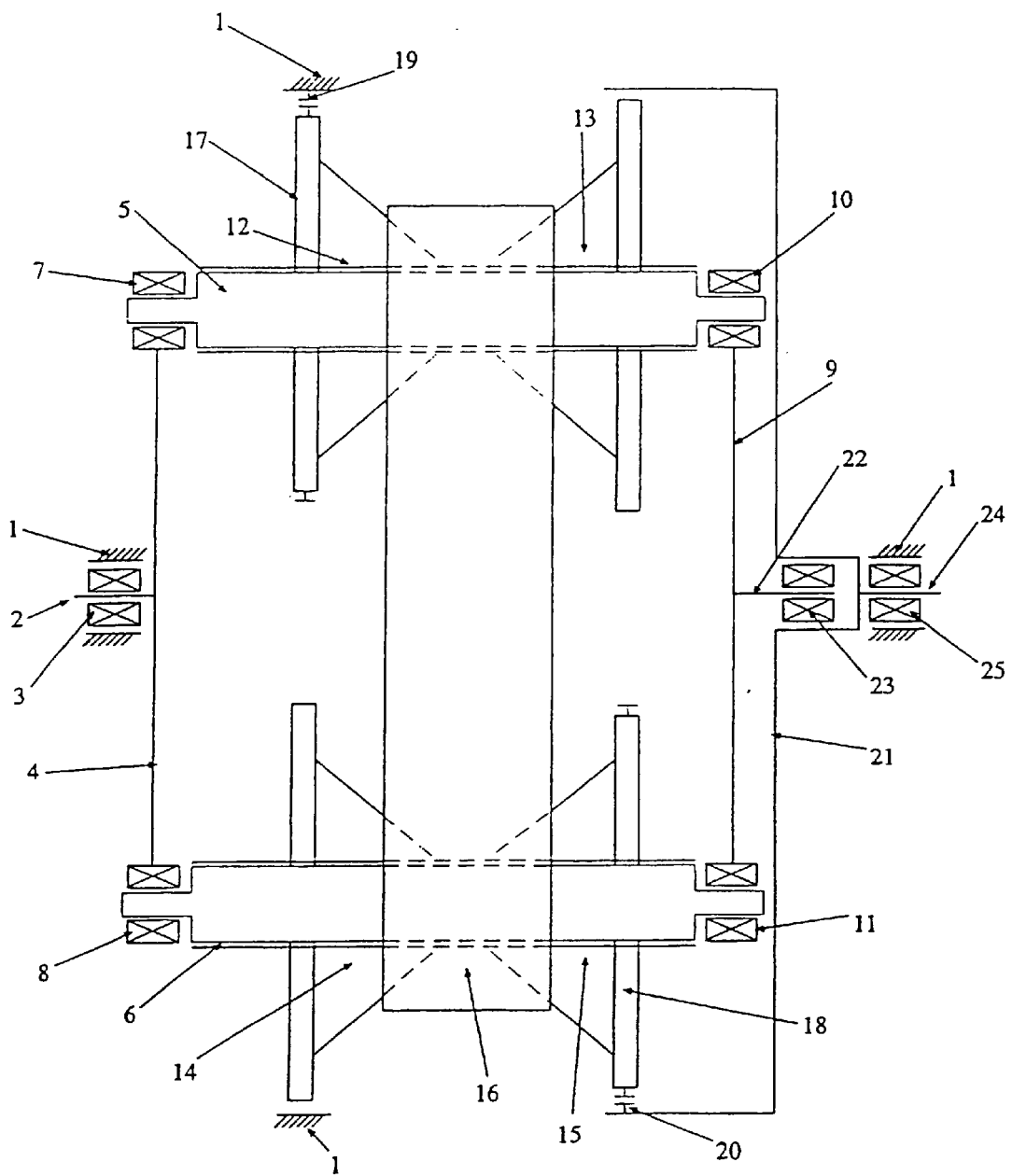
FIG. 1 is a schematic diagram of a belt type CVRT according to the present invention.

Referring initially FIG. 1, the housing, frame or other fixing points which may be used is given the reference numeral 1 and indicated using conventional ground symbols. The input shaft 2 passes through the housing at a bearing 3 and terminates in an input arm 4, fixedly mounted to the end of the input shaft. Two splined shafts 5 and 6 are rotatably mounted in bearings 7 and 8, one at each end of the input arm 4, the shafts being parallel to each other and to the axis of the input shaft 2, about which they orbit.

To avoid cantilevering the shafts 5 and 6 about the bearings 7 and 8, the input shaft may be extended through the input arm 4 and may be rigidly fixed to an additional input arm 9, although this input shaft extension is omitted for clarity. The opposite end of each of the splined shafts 5 and 6 may then be supported in additional bearings 10 and 11 within the additional arm 9.

A first pair of variable pulley cones 12 and 13 are mounted on the first splined shaft 5 and a second pair of variable pulley cones 14 and 15 are mounted on the second splined shaft 6. A suitable variable speed pulley belt 16 sits around the cone pairs so as to transmit rotation from the first cone pair 12 and 13 to the second cone pair 14 and 15, thereby forming a continuously variable transmission (CVT) sub-assembly. The pulley cones 12 and 13 may be adjusted apart along the splined shaft 5, while the pulley cones 14 and 15 are adjusted towards each other along the second splined shaft 6 to increase the ratio of the continuously variable transmission subassembly.

The two diagonally opposed pulley cones 12 and 15 may each include a ring of gear teeth or may be fixed to respective input and output pulley gear wheels 17 and 18 as shown. The input pulley gear wheel 17 may be fixed by any known method to the first pair of pulley cones 12 and 13, which form the input pulley of the CVT sub-assembly, such that drive is transmitted. For example the gear wheel 17 may be fixed to the first splined shaft 5, not directly to either of the pulley cones 12 and 13, but driving both through the splined shaft 5, or formed into the perimeter of one of the pulley cones 12. The fixing of the output pulley gear wheel 18 may similarly be performed using any known method. Input pulley gear wheel 17 meshes with an internal gear ring 19 fixed inside the housing 1 in an epicyclic arrangement. Similarly, gear wheel 18 meshes with an internal gear ring 20 located inside of, and fixed with respect to, the output frame 21.

The additional input arm 9 may include a stub axle 22, aligned with the input shaft 2. Alternatively the stub axle may be formed by the input shaft extending through input arm 4. The stub axle may be supported within a bearing 23 located within the output frame 21. The output frame 21 is rigidly fixed to an output shaft 24, itself located by a bearing 25 in the housing 1.

The meshing of the gear wheel 17 with the internal gear ring 19 inside the housing determines the ratio of the angular velocity of the input shaft 2, to the angular velocity of the pulley cone pair 12 and 13 on the first splined shaft 5.

The pulley belt 16 transmits the rotation from pulley cone pair 12 and 13 to pulley cone pair 14 and 15. If the CVT sub-assembly is set to a ratio equal to the inverse of the ratio between the gear wheel 17 with the ring gear 19 and the gear wheel 18 with ring gear 20, the CVT subassembly will rotate at the angular velocity of the input shaft, while the output frame 21 remains stationary. The angular velocity of the output shaft can be continuously varied forwards from zero by increasing the CVT ratio, and similarly the output shaft can be continuously varied backwards from zero by decreasing the CVT ratio.

Figure 2:
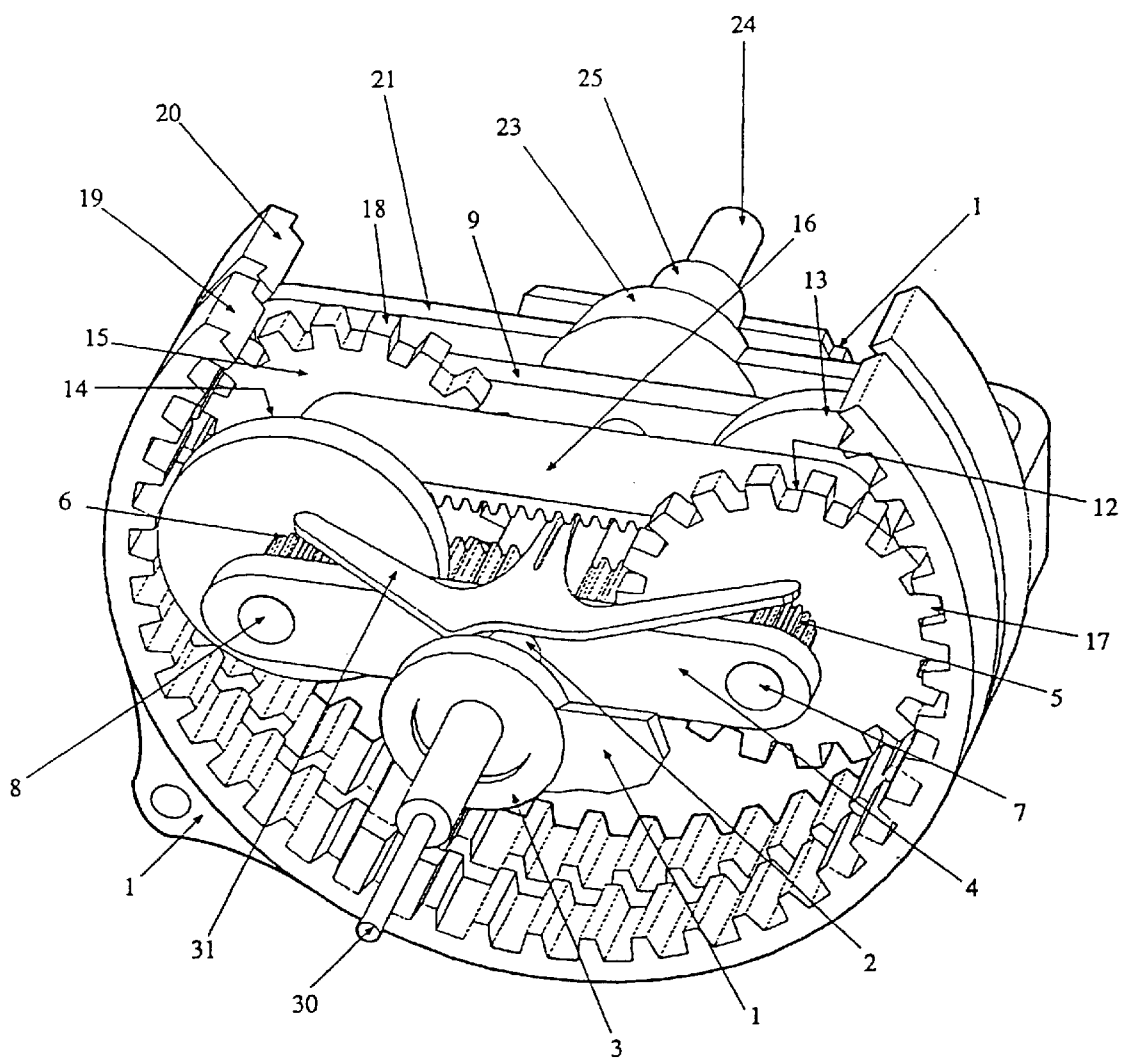
FIG. 2 is a cut-away view of a transmission constructed in the arrangement shown in FIG. 1.

Referring now to FIG. 2, a three dimensional cut-away drawing of one possible arrangement of the present invention is shown. The arrangement is similar to that described with respect to FIG. 1 with like parts retaining the same reference numeral. Here the input shaft 2 extends through the input arm 4 to the additional input arm 9, and is rigidly fixed to both by welds to increase the strength and stability of the arrangement locating the CVT assembly.

A ratio selector arrangement is shown to provide control of the CVT ratio, and includes a selector input shaft 30 (inside a hollow input shaft 2) and a pulley positioning arm 31. The ratio selector arrangement opens one pulley cone pair as it closes the other pulley cone pair, and vice versa, creating a variable trough between the pulley cones of each pair.

When the two pairs of cones are set the same distance apart and the belt rides at the same depth of trough, the drive speed transmitted from one pulley cone pair to the other is equal, ie the ratio of the CVT assembly is 1:1. Assuming that the gear wheels 17 and 18 are of the same size, and that the internal gear rings 19 and 20 are of the same size, when the ratio of the CVT assembly is 1:1, the internal gear ring 20 fixed inside the output frame 21, is maintained in equilibrium with the internal ring gear fixed inside the housing 1, ie the output shaft is stationary and the CVRT has zero output rotational velocity, regardless of the input rotational velocity.

When the selector shaft 30 is moved to widen the trough between pulley cone pair 12 and 13, and narrow the trough between pulley cone pair 14 and 15, the pulley belt 16 moves down the widening trough between pulley cone pair 12 and 13 and climbs up the narrowing trough between pulley cones 14 and 15. This reduces the drive speed of pulley cone pair 14 and 15 relative to pulley cone pair 12 and 13. As the pulley cone pair 14 and 15 slow, the gear wheel 18 attached to them begins to drive the internal gear ring 20 (fixed inside the output frame 21) around in the same direction as the input shaft 2, producing a variable forward rotation of the output shaft 24. The variable gain decreases exponentially, but can still produce a forward ratio in excess of 0.5:1 using equal size gear wheels 17 and 18 and equal size gear rings 19 and 20, representing a more than adequate final drive output.

By moving the selector shaft 30 in the opposite direction, the trough between pulley cone pair 12 and 13 narrows as the tough between pulley cone pair 14 and 15 widens. The pulley belt 16 climbs up the trough between cone pair 12 and 13 and moves down the trough between cones 14 and 15, so the CVRT moves out of the forwards range, back to neutral.

Moving the selector still further in this direction, the belt continues to climb up the trough between cone pair 12 and 13 and moves down the trough between cones 14 and 15. The drive speed of pulley cone pair 14 and 15 increases beyond that of pulley cone pair 12 and 13 and gear wheel 18 begins to drive the internal gear ring 20 around in the opposite direction to the input shaft 2, thus giving a reverse mode. The gain of reverse ratio increases exponentially, but for this purpose, only a small gain is required.

Figure 3:
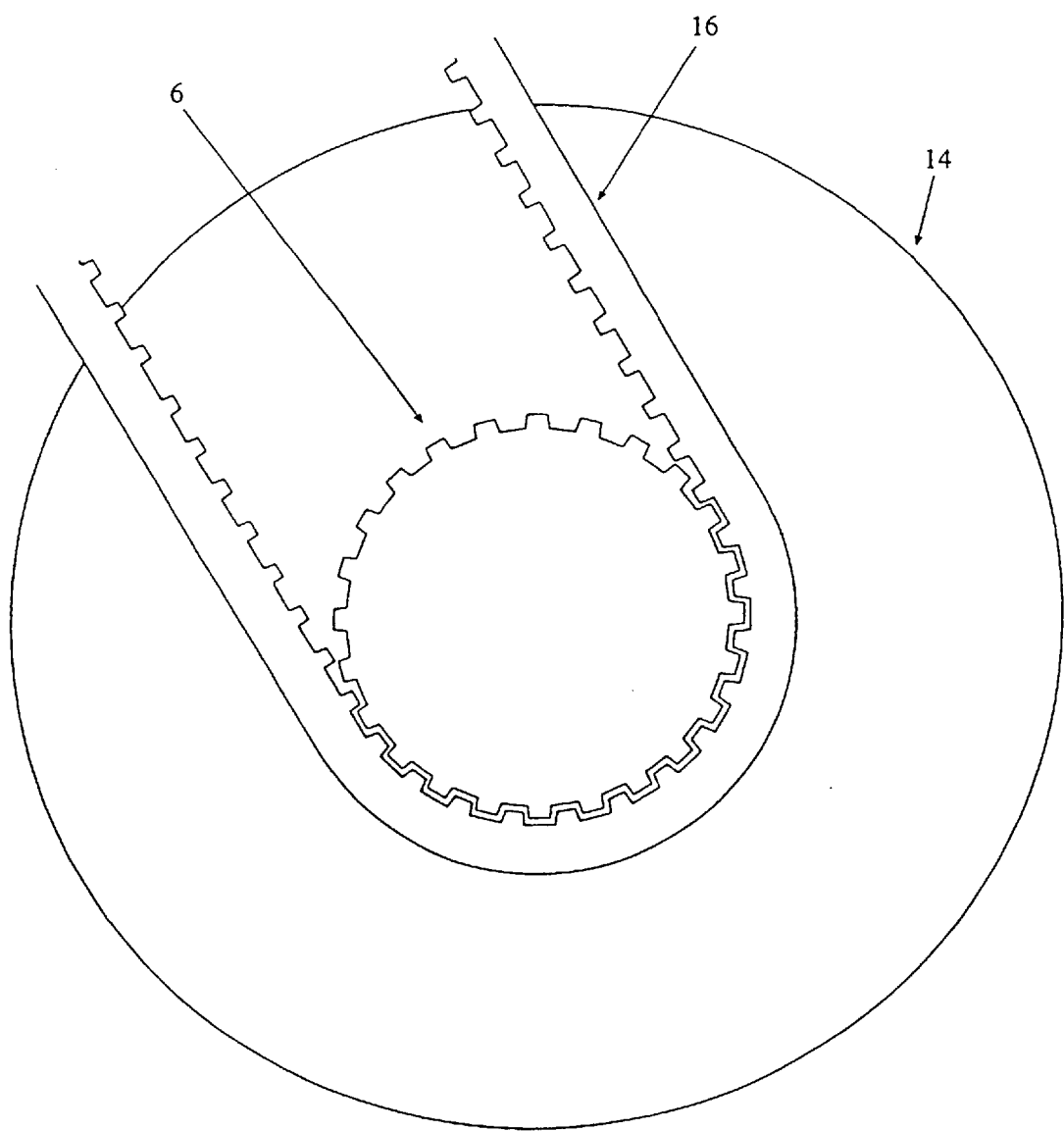
FIG. 3 shows a section through the CVT pulley and belt.

It may be useful in some applications to spline the shaft 6 of the pulley set 14 and 15 to a size and shape to mesh with a toothed pulley belt, as shown in FIG. 3. In this way, slippage is avoided and reverse is given a constant ratio for safety.

The overall ratio range available from the transmission can be increased by a number of measures. For example, increasing the spacing between the splined shafts 5 and 6, reducing the diameter of the output ring gear 20, using a larger gear 17 on the first splined shaft 5 and/or a smaller gear 18 on the second splined shaft all have the effect in lengthening the maximum forward ratio available from the transmission. Alternatively, different layouts of the transmission can provide different ranges of forward and reverse speeds, while still providing the seamless forward, through zero to reverse functionality of the transmission shown in FIGS. 1 to 3.

Figure 4:
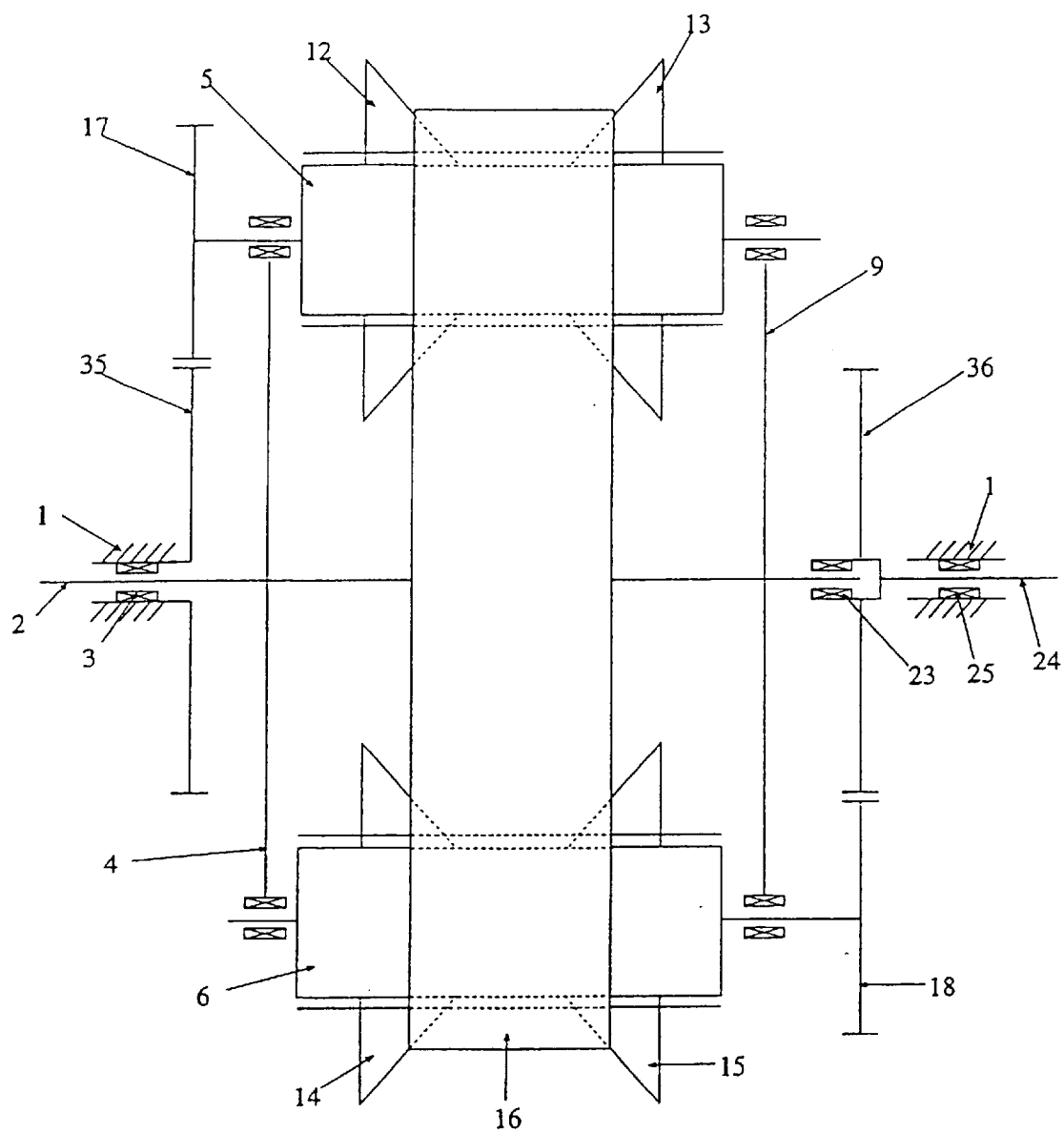
FIG. 4 is a schematic diagram of an alternative arrangement of the transmission.

FIG. 4 shows one such alternative arrangement. Here the gear 17 inputting drive into the CVT portion of the assembly is driven by being engaged with a central stationary gear 35 having external teeth instead of the internal gear ring inside the housing of the earlier arrangement. Similarly the CVT output gear 18 now meshes with a central output gear 36 which is aligned with and fixed to the output shaft 24. The stationary input gear 35 is analogous to the input ring gear 19 fixed to the housing in earlier figures and the output gear 36 fixed to the output shaft is analogous to the ring gear 20 fixed inside the output frame 21 in earlier figures.

To reduce or increase the available range of ratios of the transmission, a combination of the internal ring gear arrangement of FIGS. 1 to 3 and the smaller, central, external tooth gear wheel arrangement of FIG. 4 may be used, one arrangement being used for the stationary gear on the input side of the CVT and the other arrangement being used for the output gear. Alternatively the stationary central gear 35 may be fixed to the input shaft instead of to the housing to change the ratio of the transmission. The central stationary gear 35 may be switched between being fixed to the housing and fixed to the input shaft to gain dual range. Alternatively, different stationary input gears and/or overall output gears may be provided with respective paired CVT input and output gears to allow different input and output ratios to be selected, providing a more tuneable dual range option for example.

It should also be appreciated that one or both of the CVT input and output gears 17 and 18 may be respectively linked to the respective stationary input wheel 35 and output wheel 36 by any known means. For example, the direction of rotation of the CVT portion of the transmission may be reversed, or the ratios of the input and output to the CVT portion can be changed independently of the diameters of the gear wheels by using a chain drive. Similarly, the gear wheels can be replaced by pulley wheels and belts used to transmit the motion. Indeed, these input and output pulley and bell arrangements to the CVT portion can be CVT arrangements themselves, although this can be complex to control—electronic control is very useful to be able to optimise this complex arrangement of up to three CVTs, especially to gain control of the zero output state with accuracy.

Figure 5:
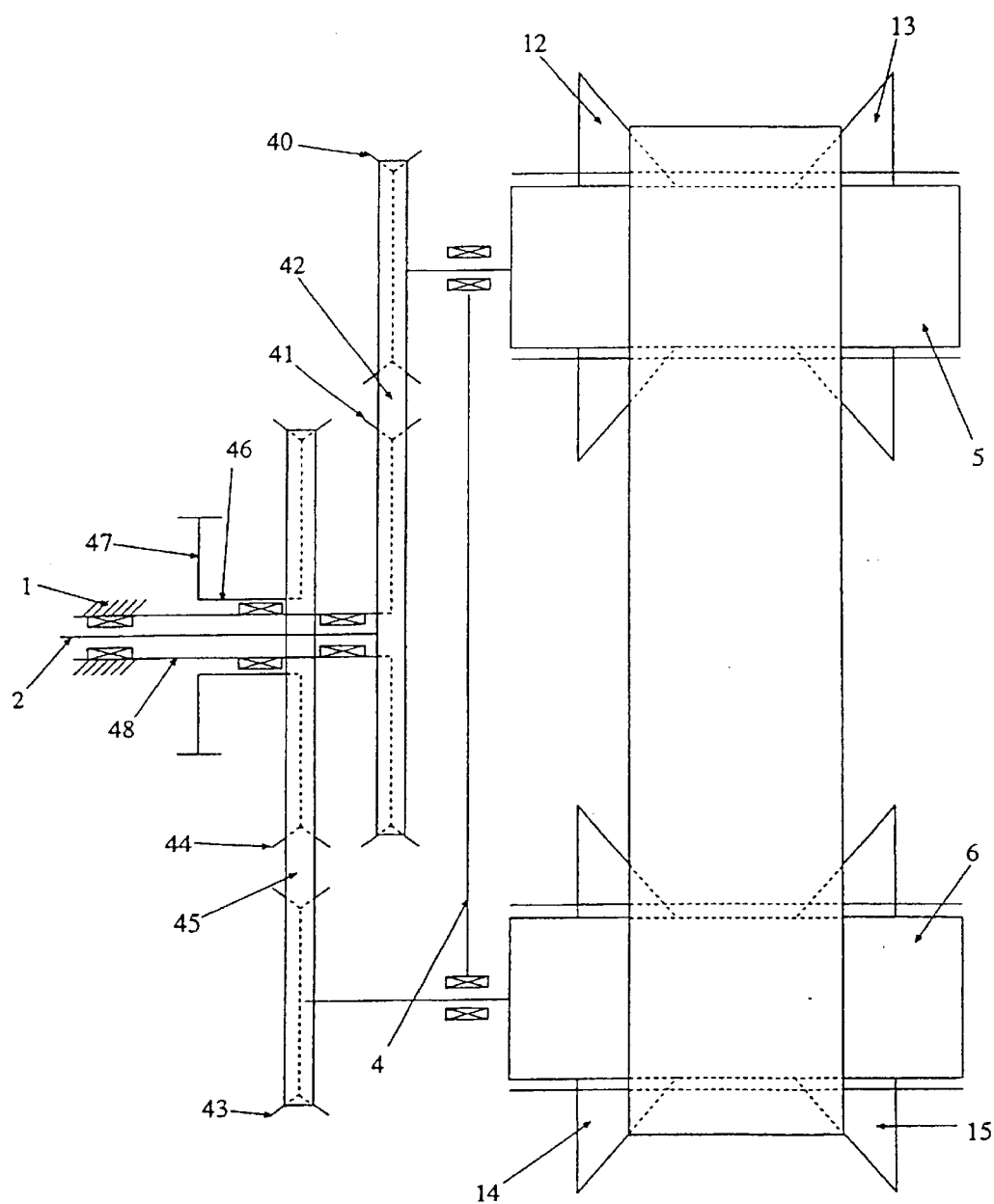
FIG. 5 is a schematic diagram of a further alternative arrangement of the transmission.

FIG. 5 shows a fixed ratio input and output pulley and belt arrangement to the CVT portion of the transmission (which could obviously be replaced by variable arrangements as mentioned above). It also shows another alternative layout of the transmission. The input shaft 2 drives the input arm 4, which in turn holds the first and second shafts 5, 6 of the CVT as before. The CVT input gear has been replaced by a CVT input pulley wheel 40 and the stationary input gear is now a stationary input pulley 41 fixed to ground or the housing. Pulley belt 42 couples the two input pulley wheels 40 and 41 together, so as the input arm 4 rotates, the CVT input pulley wheel 40 rotates about the stationary input pulley wheel 41 causing the rotation of the CVT input wheel 40 about the first shaft 5 of the CVT. Obviously the rotation of the CVT input pulley wheel, the first CVT shaft, the CVT belt and the second CVT shaft are reversed compared to the previous arrangements by the use of the belt 42 instead of direct contact between the CVT input wheel and the stationary input wheel.

CVT pulley belt 16 couples the second CVT shaft 6 to the first shaft 5 by a variable ratio. The CVT output pulley wheel 43 is shown positioned on the same side as the input—this layout can be applied to any of the arrangements described herein. The CVT output pulley wheel 43 is coupled to the output pulley 44 by a pulley belt 45. The output pulley wheel 44 is fixed to an output gear wheel 47 (from which the final drive can be taken) by a hollow output shaft 46 which itself is rotatably mounted over the tube 48 fixing the stationary input wheel to the housing 1 (or other suitable fixed point).

Figure 6:
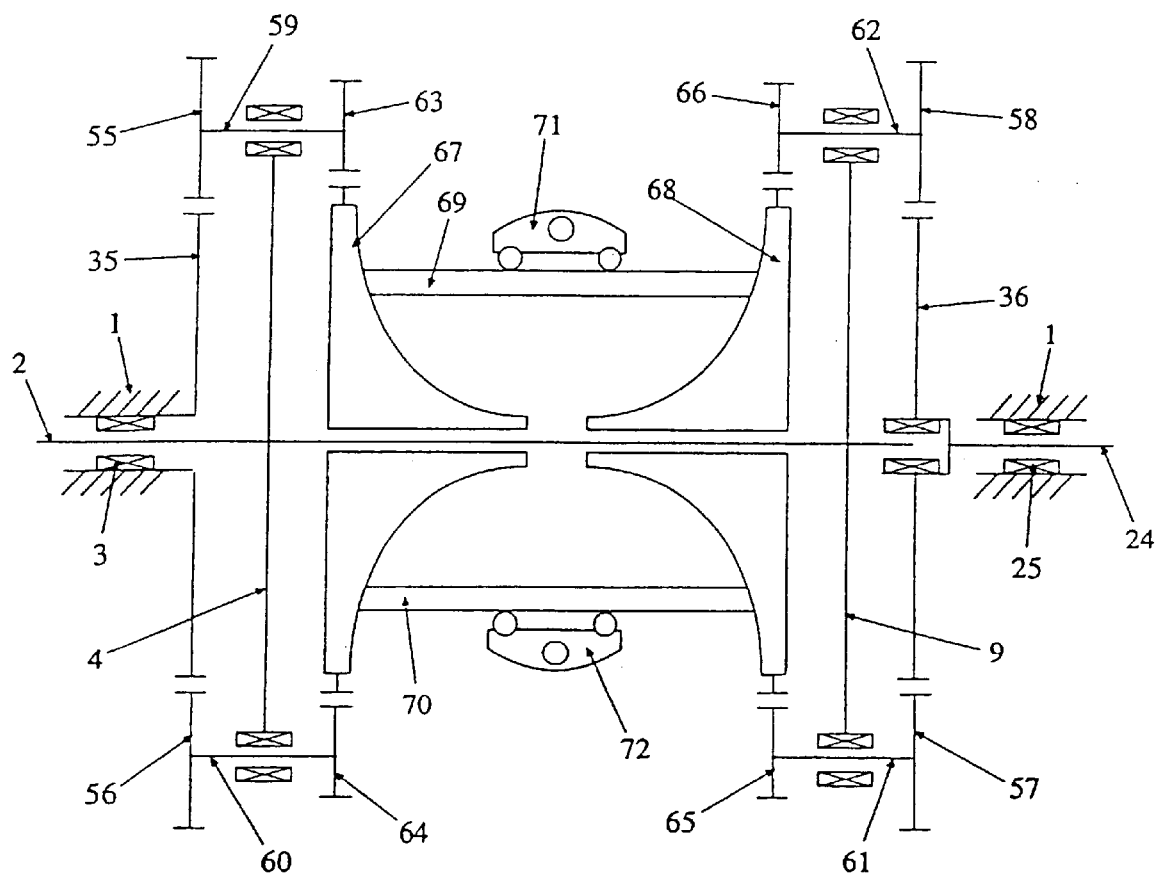
FIG. 6 is a schematic diagram of a toroidal version of the present invention.

The continuously variable transmission function of the CVT which spins with the input shaft can be achieved using any known method, adapted to the concept of the present invention, ie to run it rotating as a whole within a planetary gear type system. FIG. 6 shows a contoured friction disc version of the present invention, the CVT operation being similar to a part of a conventional toroidal CVT arrangement, adapted according to the present invention. Two CVT input wheels 55, 56 are shown in the input arm 4 and two CVT output wheels 57, 58 are shown in the additional input arm 9. It should be appreciated that any number of input and output wheels may be used in this layout, spreading the load as in a normal planetary gear train. As the input arm 4 rotates about the stationary input wheel 35 (or sun gear), the two CVT input wheels 55, 56 are driven, in turn causing the CVT input shafts 59, 60 to rotate. Additional CVT input wheels 63, 64 are fixed to the other end of each CVT input shaft and therefore also rotate as the input arm turns relative to the stationary or fixed input wheel 35. The additional input wheels engage teeth around the perimeter of the CVT input friction disc 67, which is rotatably mounted by bearings onto the input shaft 2. Similarly the CVT output friction disc 68 is rotatably mounted onto the input shaft, the CVT output friction disc being driven by the friction wheels 69 and 70 which may be controlled by the angle of the roller paddles 71, 72 to vary the contact points between the friction wheels and the friction discs to gain a continuously variable power transmission device.

Additional CVT output wheels 65, 66 engage with the perimeter of the CVT output friction disc 68 and transit rotation along CVT second shafts 61, 62 to the overall output wheel 36 which is fixed to the output shaft 24. With this arrangement, and a fixed input rotational speed, once again the variation of the CVT ratio allows the rotation of the output shaft to be continuously varied from reverse, through zero to forwards.

Alternatively, the stationary input wheel may be in the form of an internally toothed gear ring, with the CVT input wheels meshing directly between the internally toothed gear ring and the CVT input friction disc. This makes the arrangement look more like a conventional planetary gearbox, with the stationary input wheel being the ring gear, the CVT input wheels being the planets, and the CVT input friction disc being the sun gear. Similarly, the output can be modified in this way, instead, or in addition to the input modifications described above. This reduces the parts count and can produce different output ratio ranges.

Although in FIG. 6, the CVT input wheels are shown mounted to shafts rotatably mounted in the input arm 4 and the CVT output wheel are shown mounted to shafts rotatably mounted in the further input arm 9, it must be appreciated that as the input arm and the further input arm do not rotate with respect to each other, using longer shafts, all the CVT input and output wheels can be mounted to different portions of the input arm which may extend radially from the input shaft.

Figure 7:
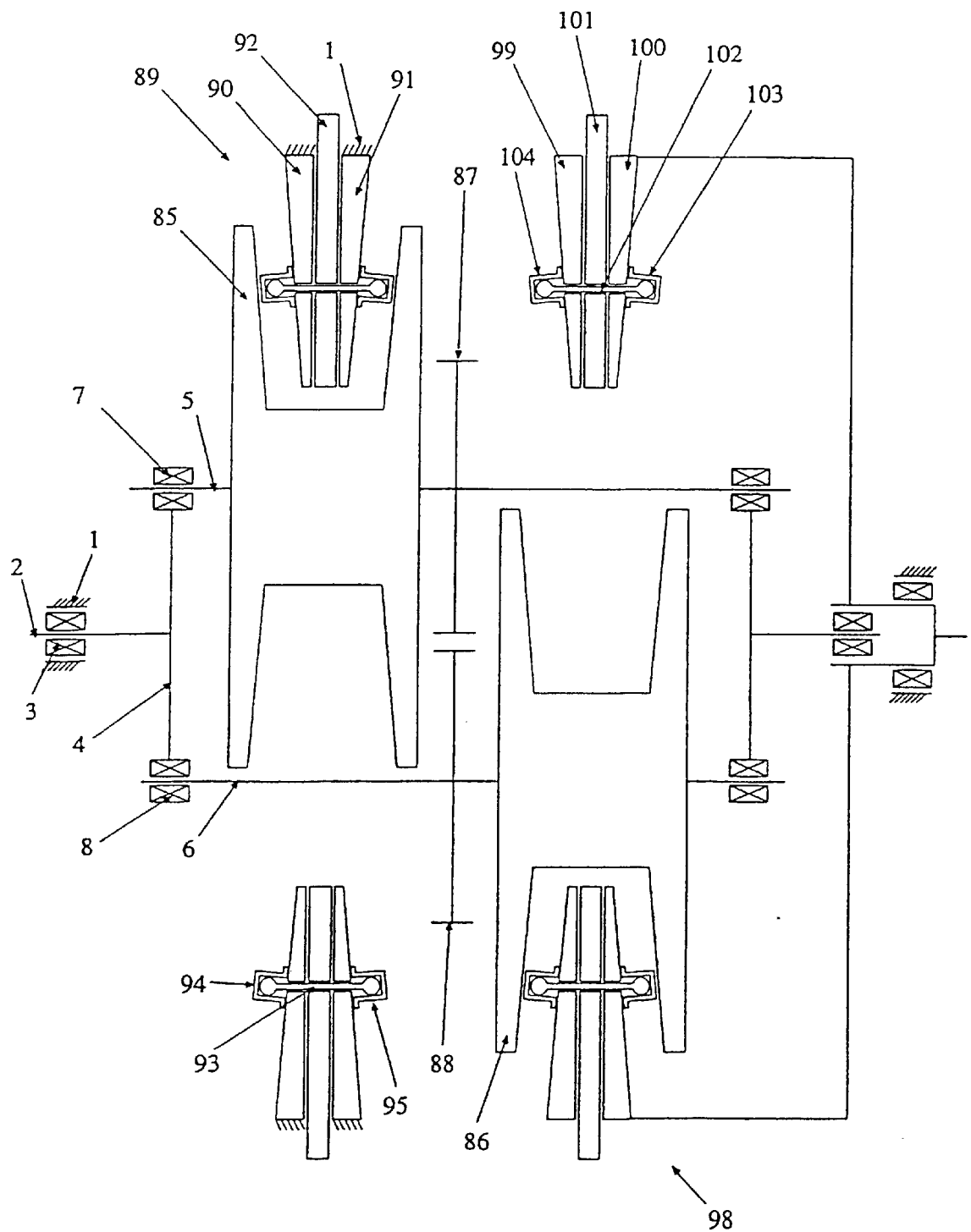
FIG. 7 is a schematic of a still further alternative arrangement of the transmission.

FIG. 7 shows a compound CVT arrangement, where two CVT ratios may be used in series to gain a greater range of output speeds for the continuously variable reversible transmission. As in the earlier figures, an input arm 4, fixed to the input shaft 2, retains bearings 7 and 8. First and second CVT shafts 5 and 6 are rotatably mounted into the input arm 4 by the bearings 7 and 8 and have fixed to them pulley wheels 85, 86. The input pulley wheel 85 is fixed to the first CVT shaft 5 and can include a toothed section around its perimeter (or integrated into the side at a different diameter) to mesh with a similar arrangement on the output pulley wheel 86. Alternatively, as shown in the schematic diagram in FIG.

7, first and second gears 87, 88 may be fixed to the first and second shafts to transmit rotation between the first and second shafts 5 and 6. A belt drive may alternatively be used between the first and second shafts 5 and 6.

Figure 8:
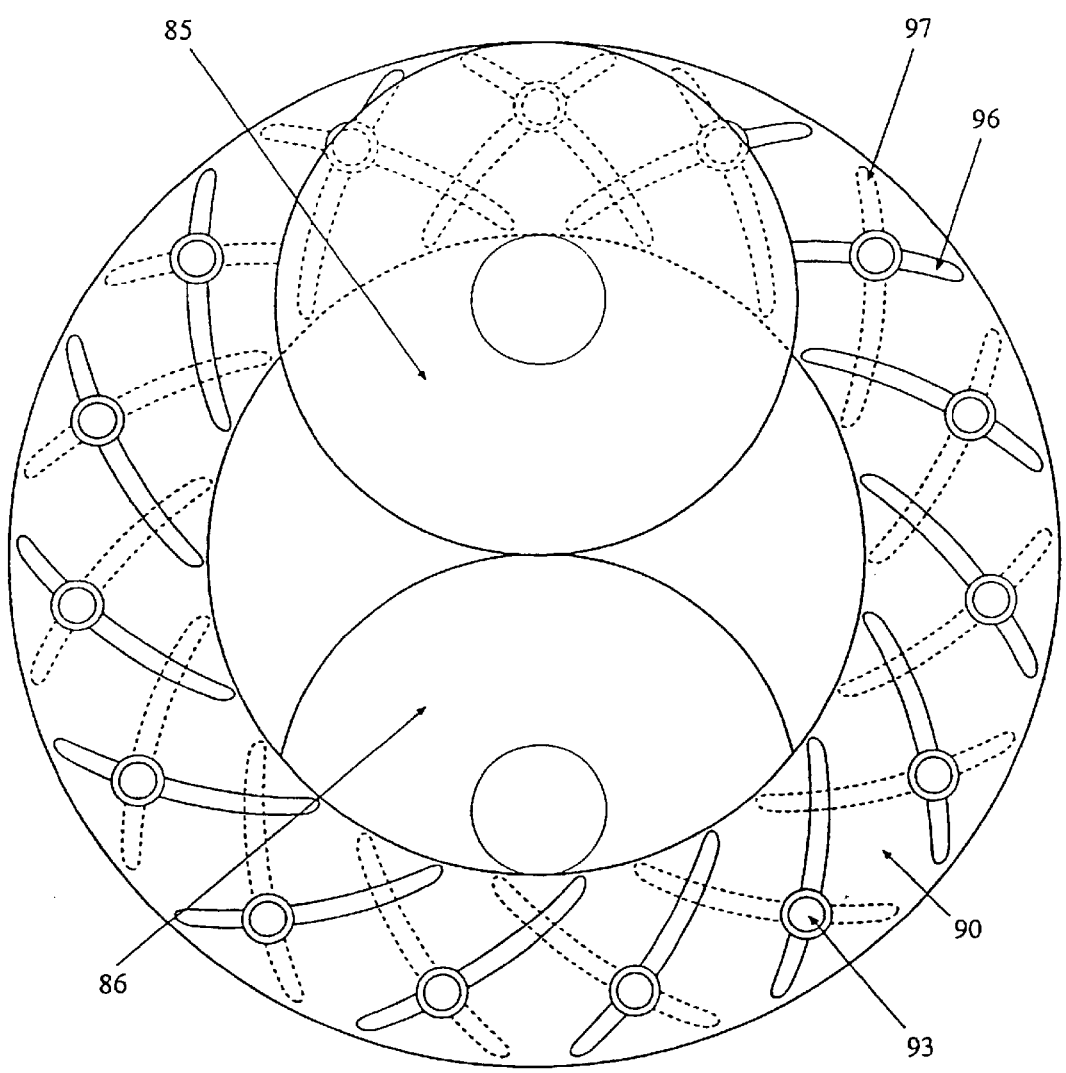
FIG. 8 shows a side view of one possible ratio selector arrangement for the transmission shown in FIG. 7.

A fixed input wheel 89 is provided to engage with the input pulley wheel 85, the fixed input wheel comprising two outer angled rings 90, 91 and a central selector disc 92. A pin 93 with a ball on each end passes through the selector disc and has a friction cup 94, 95 on either end. A number of these sets of pins and friction cups are provided around the fixed input wheel, giving multiple simultaneous contact points as the rotation of the input shaft 2 causes the input pulley wheel 85 to move around the input shaft major axis. As the selector disc is rotated, the radial position of the pins from the input shaft major axis is varied, using a mechanism as shown in FIG. 8. Angled slots 96 in the outer angled rings run in an approximately opposing direction to angled slots 97 in the selector disc, so as the selector disc is rotated clockwise, the pins 93 move away from the centre, and as the selector disc is rotated anticlockwise, the pins move towards the centre. The friction cups 94, 95 contact with the input pulley wheel, giving a variable input CVT ratio which can be varied by moving the pins in and out. Similarly the overall output wheel 98 is driven at a variable output CVT ratio by moving the pins 102 and their associated friction cups 103 and 104 in and out.

Although a mechanical arrangement for adjusting the radial position of the pins 93 and 102 has been discussed, it should be noted that the radial position of the pins (93, 102) may alternatively be controlled by a hydraulic or electromechanical arrangement and/or a centrifugal mechanism, dispensing with the selector disc. This can be especially advantageous in adjusting the output CVT ratio, as the output disc rotates with the output shaft. For a set input rotation direction, as the input and output CVT ratios are varied, the output shaft rotation can be continuously varied from reverse, through zero to forwards.

The most appropriate choice of CVRT arrangement depends on the application. For example, for the belt versions of the invention, the speed of the CVT components can be increased to reduce torque in the CVT sub-assembly, giving improved torque capability for a given transmission size. Similar steps can be taken to reduce torque in the other arrangements. The control of the CVT ratio can be achieved by many means such as by a centrifugal regulator with manual, electronic or electro-hydraulic override. The parts count can be reduced compared to prior art transmissions of the reversible CVT type. The CVT belt speed reduces with increasing output speed, and the initial starting torque is low, allowing the use of light weight composites and plastics. The transmission can be smaller and lighter, increasing the breadth of possible applications. For example the transmission can be made from very light weight materials for use on motorcycles (and may even be mounted in the hub), giving reverse gear simply, which is currently difficult on motorcycles, so usually they do not have reverse or they have to use additional separate electrically driven mechanisms.

The rotation of the CVT sub-assembly and the way power and torque are transmitted through the entire continuously variable reversible transmission allow the concept to be designed for a wide range of applications. The package can be small and the torque capacity high, the range of forward and reverse ratios can be adjusted through a wide range at the design stage, the low weight and simple, reliable construction being additional benefits.

It should be understood that the scope of the invention is not limited by the above description of the drawings.

The claims defining the invention are as follows:

1. A continuously variable reversible transmission system including an input shaft, a housing, an input arm, first and second CVT shafts, a fixed input wheel, a ratio selector mechanism, an overall output wheel and an output shaft, the input shaft having a major axis, the input arm being fixed to the input shaft, the input arm including at least first and second portions, each input arm portion extending substantially perpendicular to the input shaft, at each end of the input arm first and second portions, a respective first and second CVT shaft is rotatably mounted, each of the first and second CVT shafts having a respective major axis extending substantially parallel to the input shaft, the major axis of each of the respective first and second CVT shafts being the axis of rotation of the respective shaft with respect to the input arm, the fixed input wheel being aligned with the major axis of the input shaft, the first CVT shaft being coupled with the fixed input wheel, the second CVT shaft being coupled with the first CVT shaft, the overall output wheel being coupled with the second CVT shaft, the overall output wheel being fixed to the output shaft, wherein the first and second CVT shafts orbit around the major axis of the input shaft due to rotation of the input shaft, such that changing a ratio of at least one of the couplings produces a variation of the speed of the output shaft from forwards, through zero to reverse.

2. A continuously variable reversible transmission system according to claim 1 including a CVT sub-assembly which rotates about the major axis of the input shaft, the CVT sub-assembly including the input arm, the first and second CVT shafts, a CVT input wheel and a CVT output wheel, the CVT input wheel being mounted on the first CVT shaft such that relative rotation of the CVT input wheel and the first CVT shaft is prevented, the coupling of the first CVT shaft with the fixed input wheel including the CVT input wheel, the CVT output wheel being mounted on the second CVT shaft such that relative rotation of the CVT output wheel and the second CVT shaft is prevented, the coupling of the second CVT shaft with the output wheel including the CVT output wheel, the rotation of the CVT sub-assembly thereby causing rotation of the CVT input wheel relative to the fixed input wheel, resulting in a rotation of the first CVT shaft about its major axis in addition to its orbit about the major axis of the input shaft, the coupling between the first CVT shaft and the second CVT shaft in the CVT sub-assembly being arranged to permit a variable rotation of the second CVT shaft relative to the first CVT shaft, producing a variable CVT ratio, the variable rotation of the second CVT shaft and the CVT output wheel about the major axis of the second shaft in addition to the orbit of the second shaft about the major axis of the input shaft thereby causing a rotation of the overall output wheel due to the coupling between the CVT output wheel and the overall output wheel, the overall output wheel being fixed to the output shaft, the rotation of the output shaft being zero when the CVT ratio is of a set magnitude, as the CVT ratio is increased above the set magnitude, the output shaft turns in a forward direction and as the CVT ratio is decreased below the set magnitude, the output shaft turns in a reverse direction.

3. A continuously variable reversible transmission system according to claim 2 wherein the set magnitude of the CVT ratio required to produce zero rotation of the output shaft is calculated from the effective pitch circle diameters of at least the CVT input wheel, the CVT output wheel and the overall output wheel.

4. A continuously variable reversible transmission system according to claim 2 wherein the fixed input wheel and the CVT input wheel are both toothed gear wheels.

5. A continuously variable reversible transmission system according to claim 4 wherein the fixed input wheel is an external tooth gear wheel.

6. A continuously variable reversible transmission system according to claim 4 wherein the fixed input wheel is an internally toothed gear wheel meshing with the CVT input wheel.

7. A continuously variable reversible transmission system according to claim 2 whereby the coupling between the fixed input wheel and the CVT input wheel is by a looped link.

8. A continuously variable reversible transmission system according to claim 7 wherein the fixed input wheel and the CVT input wheel are pulley wheels and the looped link is a belt.

9. A continuously variable reversible transmission system according to claim 8 wherein the pulley wheels are of variable width, the pulley wheels and belt thereby providing a variable ratio of the coupling between the fixed input wheel and the CVT input wheel.

10. A continuously variable reversible transmission system according to claim 7 wherein the looped link is a chain.

11. A continuously variable reversible transmission system according to claim 2 wherein the overall output wheel and the CVT input wheel are both toothed gear wheels.

12. A continuously variable reversible transmission system according to claim 11 wherein the overall output wheel is an external tooth gear wheel.

13. A continuously variable reversible transmission system according to claim 11 wherein the overall output wheel is an internally toothed gear wheel meshing with the CVT output wheel.

14. A continuously variable reversible transmission system according to claim 2 whereby the coupling between the overall output wheel and the CVT output wheel is by a looped link.

15. A continuously variable reversible transmission system according to claim 14 wherein the overall output wheel and the CVT output wheel are pulley wheels and the looped link is a belt.

16. A continuously variable reversible transmission system according to claim 15 wherein the pulley wheels are of variable width, the pulley wheels and belt thereby providing a variable ratio of the coupling between the overall output wheel and the CVT output wheel.

17. A continuously variable reversible transmission system according to claim 14 wherein the looped link is a chain.

18. A continuously variable reversible transmission system according to claim 2 wherein the CVT sub-assembly includes a first and a second pair of variable cone pulley wheels coupled by a pulley belt,
the first pair of variable cone pulley wheels being located on the first CVT shaft such that the space between the pulley wheels can be varied and such that the pulley wheels are driven to rotate with the first CVT shaft, the second pair of variable cone pulley wheels being located on the second CVT shaft such that the space between the pulley wheels can be varied and such that the pulley wheels are driven to rotate with the second CVT shaft,
the pulley belt running between and engaging the first and second pairs of variable cone pulley wheels such that as the spacing between the variable cone pulley wheels of each pair of variable cone pulley wheels is changed in opposing directions, the rotation of the second pair of variable cone pulley wheels is increased or reduced in relation to the rotation of the first pair of variable cone pulley wheels, thereby producing a variable CVT ratio.

19. A continuously variable reversible transmission system according to claim 18 wherein the CVT input wheel is an integral part of one of the pulley wheels of the first pair of variable cone pulley wheels.

20. A continuously variable reversible transmission system according to claim 18 wherein the CVT output wheel is an integral part of one of the pulley wheels of the second pair of variable cone pulley wheels.

21. A continuously variable reversible transmission system according to claim 2 wherein the CVT sub-assembly includes first and second curved friction discs and at least two friction wheels, a second CVT input wheel and a second CVT output wheel,
the first and second curved friction discs being located along the major axis of the input shaft such that they are free to rotate about said axis,
the second CVT input wheel being fixed to the first CVT shaft and being coupled to the first curved friction disc, the second CVT output wheel being fixed to the second CVT shaft and being coupled to the second curved friction disc,
each of the at least two friction wheels being in contact with each of the curved friction discs, the contact points between the friction wheels and the curved friction discs being controlled by an angular rotation of the friction wheels about an axis which is substantially perpendicular to the input shaft major axis such that as the contact points are varied along the curve of each curved friction disc by controlling the angular rotation of the friction wheels, the rotational speed of the second curved friction disc is changed in relation to the rotational speed of the first curved friction disc, thereby producing a variable CVT ratio.

22. A continuously variable reversible transmission system according to claim 1 including respective first and second pulley wheels fixedly mounted to the first and second CVT shafts,
the first and second pulley wheels each including at least one angled channel around its periphery,
the fixed input wheel being an external ring including friction nodes which contact the at least one angled channel of the first pulley wheel, the friction nodes being controlled radially to vary the point of contact between the friction nodes and the first pulley wheel, to thereby provide a first variable ratio between the rotational velocity of the input shaft about its major axis and the rotational velocity of the first pulley wheel about the major axis of the first CVT shaft,
the overall output wheel being an external ring including friction nodes which contact the at least one angled channel of the second pulley wheel, the friction nodes being controlled radially to vary the point of contact between the friction nodes and the second pulley wheel, to thereby provide a second variable ratio between the rotational velocity of the second pulley wheel about the major axis of the second CVT shaft and about the major axis of the input shaft and the rotational velocity of the overall output wheel about the input shaft major axis,
the rotation of the output shaft being zero when the ratio between the first variable ratio and the second variable ratio is of a set magnitude.

23. A continuously variable reversible transmission system according to claim 1.

* * * * *